United States Patent
Hsieh et al.

(10) Patent No.: US 8,742,832 B2
(45) Date of Patent: Jun. 3, 2014

(54) MULTI-STEP CHARGE PUMP AND METHOD FOR PRODUCING MULTI-STEP CHARGE PUMPING

(75) Inventors: Chih-Yuan Hsieh, Hsinchu (TW); Lan-Shan Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 570 days.

(21) Appl. No.: 12/235,620

(22) Filed: Sep. 23, 2008

(65) Prior Publication Data

US 2009/0256626 A1 Oct. 15, 2009

(30) Foreign Application Priority Data

Apr. 14, 2008 (TW) ................................ 97113493 A

(51) Int. Cl.
*G05F 1/10* (2006.01)
*H02M 3/07* (2006.01)

(52) U.S. Cl.
CPC ................................ *H02M 3/073* (2013.01)
USPC ........................................................ 327/536

(58) Field of Classification Search
USPC .............. 327/530, 534–541, 543; 363/59, 60; 307/110
See application file for complete search history.

(56) References Cited

U.S. PATENT DOCUMENTS

| | | | |
|---|---|---|---|
| 6,198,645 B1 * | 3/2001 | Kotowski et al. | 363/59 |
| 6,563,235 B1 * | 5/2003 | McIntyre et al. | 307/109 |
| 6,693,808 B2 * | 2/2004 | Myono | 363/62 |
| 6,834,001 B2 * | 12/2004 | Myono | 363/60 |
| 7,468,898 B2 * | 12/2008 | Ogata et al. | 363/59 |
| 7,511,977 B2 * | 3/2009 | Oyama et al. | 363/62 |
| 7,518,892 B2 * | 4/2009 | Kitagawa et al. | 363/59 |
| 2003/0085752 A1 | 5/2003 | Rader et al. | |
| 2006/0244513 A1 * | 11/2006 | Yen et al. | 327/536 |

FOREIGN PATENT DOCUMENTS

| | | |
|---|---|---|
| TW | 200612648 | 4/2006 |
| TW | 200614261 | 5/2006 |
| TW | 200705145 | 2/2007 |

OTHER PUBLICATIONS

"Office Action of Taiwan Counterpart Application", issued on Nov. 23, 2011, p. 1-p. 6, in which the listed references were cited.
"1st Office Action of China Counterpart Application", issued on Aug. 3, 2010, p. 1-p. 6, in which the listed reference was cited.

* cited by examiner

*Primary Examiner* — Sibin Chen
(74) *Attorney, Agent, or Firm* — Jianq Chyun IP Office

(57) ABSTRACT

A multi-step charge pump having a power input terminal and a power output terminal is provided. The multi-step charge pump includes a plurality of capacitors, wherein each of the capacitors has a capacitance. A plurality of switching devices is connected among the capacitors, the power input terminal and the power output terminal. A switch-controlling unit controls the on/off states of the switches, wherein a charging-phase circuit corresponding to a pumping level is formed to charge the capacitors and an output-phase circuit is formed to output a voltage from the power output terminal. At least one of the capacitors herein is changeably selected as a voltage-regulating capacitor.

10 Claims, 13 Drawing Sheets

US 8,742,832 B2

MULTI-STEP CHARGE PUMP AND METHOD FOR PRODUCING MULTI-STEP CHARGE PUMPING

CROSS-REFERENCE TO RELATED APPLICATION

This application claims the priority benefit of Taiwan application serial no. 97113493, filed on Apr. 14, 2008. The entirety of the above-mentioned patent application is hereby incorporated by reference herein and made a part of specification.

BACKGROUND OF THE INVENTION

1. Field of the Invention

The present invention relates to the technique of multi-step charge pump.

2. Description of Related Art

A multi-step charge pump is used to, for example, change an input voltage into another input voltage, wherein the multi-step charge pump has multiple pumping levels, which can be pulled-up voltage levels or pulled-down voltage levels. In general, a multi-step charge pump is composed of a plurality of capacitors. In terms of a conventional multi-step charge pump, the output terminal thereof is electrically connected to a load to be driven; but for achieving a stable operation voltage, the load would be connected in parallel to an unchangeable capacitor and the unchangeable capacitor is termed as voltage-regulating capacitor.

FIG. 1 is a circuit diagram of a conventional charge pump. Referring to FIG. 1, a charge pump 100 is formed by two capacitors 102 and 104 and a voltage-regulating capacitor 106, wherein the voltage-regulating capacitor 106 is unchangeably in parallel connection with a load unit 120, and the voltage-regulating capacitor 106 together with the load unit 120 is connected between an output voltage Vo and a ground voltage. The capacitances of the capacitors 102 and 104 and the voltage-regulating capacitor 106 are respectively represented by C1, C2 and C3.

In the above-mentioned conventional charge pump composed of three capacitors, the capacitances thereof are, for example, the same, i.e., C1=C2=C3. The voltage-regulating capacitor 106 is connected to a grounded terminal all the time, and the terminals of other five capacitors are connected to an integrated circuit (IC). The pump is able to produce multiple voltages with different factors. FIG. 2 is a diagram showing various wiring circuits of the capacitors in the conventional charge pump of FIG. 1, wherein the wiring circuits produce a plurality of factors of voltage and the capacitors C1, C2 and C3 are subject to C1=C2=C3. Referring to FIG. 2, the charge pump herein is operated in two phases. The left circuits of the dotted lines are operated in charging-phase, and the right circuits of the dotted lines are operated in output-phase, wherein there are four factors of voltage: triple (3×), double (2×), one and a half times (1.5×), and half (0.5×) which are produced respectively by the circuits of FIGS. 2(a), 2(b), 2(c) and 2(d).

In FIG. 2(a), the conventional charge pump requires a capacitor unchangeably as the voltage-regulating capacitor and the capacitor 106 unchangeably serves as the voltage-regulating capacitor of an output voltage Vo. During the charging-phase, the capacitors 102 (C1) and 104 (C2) are charged by an input voltage Vin so as to make 102 and 104 store Vin. During the output-phase, the connection between the capacitors 102 and 104 is switched to serial connection, and the input voltage Vin is connected in series to a negative voltage terminal and another terminal thereof is connected to a voltage output terminal, so that Vo is boosted to a voltage three times greater than the voltage Vin. In FIG. 2(b), the capacitor 106 still serves as the voltage-regulating capacitor of Vo. During the charging-phase, the capacitor 102 (C1) is charged by Vin to store the voltage Vin; meanwhile, Vin is connected to the negative voltage terminal of the capacitor 104 (C2). Another terminal of the capacitor 104 (C2) is connected to the output terminal so as to boost Vo to a voltage double of the voltage Vin. During the output-phase, the capacitor 104 (C2) is charged by the input voltage Vin so as to make the capacitor 104 (C2) store Vin; meanwhile, Vin is connected to the negative voltage terminal of the capacitor 102 (C1). Another terminal of the capacitor 102 (C1) is connected to the output terminal so as to boost Vo to a voltage double of the voltage Vin. In FIG. 2(c), the capacitor 106 (C3) unchangeably serves as the voltage-regulating capacitor of Vo. During the charging-phase, the capacitors 102 and 104 in series connection are charged by Vin so as to make both capacitors store voltage of 0.5 Vin. During the output-phase, Vin is connected to the negative voltage terminal of the circuit formed by the capacitors 102 and 104 in parallel connection. Another terminal of the parallel circuit is connected to the output terminal to boost Vo to a voltage of 1.5 Vin. In FIG. 2(d), the capacitor 106 (C3) still unchangeably serves as the voltage-regulating capacitor of Vo. During the charging-phase, the capacitors 102 and 104 in series connection are charged by Vin to store the voltage of 0.5 Vin. During the output-phase, Vin is connected to the positive voltage terminal of the circuit formed by the capacitors 102 and 104 in parallel connection. Another terminal of the parallel circuit is connected to the output terminal to down push Vo to the voltage of 0.5 Vin. The factors of voltage produced by the pump are fixed and thus unchangeable to meet the user demand.

FIG. 3 is a diagram of showing various wiring circuits of the capacitors in another conventional charge pump. Differently from FIG. 2, the capacitances C1, C2 and C3 of three capacitors 102 that 104 and 106 in FIG. 3 are subject to C1:C2:C3=a:b:c, and a≠b≠c; thus, the charge pump in FIG. 3 can produce multiple voltages in different factors. Similarly to the circuits of FIGS. 2(a) and 2(b), the circuits of FIGS. 3(a) and 3(b) can respectively produce a triple voltage and a double voltage. In FIG. 3(c), the capacitor 106 (C3) unchangeably serves as the voltage-regulating capacitor of Vo. During the charging-phase, the capacitors 102 (C1) and 104 (C2) in series connection are charged by Vin so as to make the capacitor 102 store voltage of $[b/(a+b)]\times Vin$ and the capacitor 104 store voltage of $[a/(a+b)]\times Vin$. During the output-phase, $Vo=Vin-[b/(a+b)]\times Vin+[a/(a+b)]\times Vin=[2a/(a+b)]\times Vin$. In FIG. 3(d), the capacitor 106 still unchangeably serves as the voltage-regulating capacitor of Vo. During the charging-phase, the capacitors 102 (C1) and 104 (C2) in series connection are charged by Vin so as to make 102 (C1) store the voltage of $[b/(a+b)]\times Vin$ and the capacitor 104 (C2) store the voltage of $[a/(a+b)]\times Vin$. During the output-phase, $Vo=Vin+[b/(a+b)]\times Vin-[a/(a+b)]\times Vin=[2b/(a+b)]\times Vin$. The charge pump of FIG. 3 is able to adjust the capacitance ratio between the employed capacitors according to the desired factor of voltage.

FIG. 4 is a circuit diagram of yet another conventional charge pump. Referring to FIG. 4, the charge pump 100 is an enhanced one of FIG. 1, where a capacitor 108 is additionally employed for producing more pumping levels. The employed four capacitors 102, 104, 106 and 108 have the same capacitances, i.e., C1=C2=C3=C4, wherein the voltage-regulating capacitor 106 (C4) serves as the voltage-regulating capacitor and a terminal thereof is connected to a grounded terminal all the time, and the rest seven terminals of the capacitors 102, 104, 106 and 108 are connected to an IC. The charge pump herein is able to produce multiple voltages with different times, such as quadruple (4×), triple (3×), two and a half times (2.5×), double (2×), one and a half times (1.5×), 1.66 times (1.66×), 1.33 times (1.33×), 0.66 times (0.66×), a half (0.5×) and 0.33 times (0.33×).

FIGS. 5A-5B are diagrams showing various switching circuits respectively for a factor in the conventional charge pump 100 of FIG. 4. In FIG. 5A(*a*), the capacitor 106 (C4) unchangeably serves as the voltage-regulating capacitor of an output voltage Vo. During the charging-phase, the capacitors 102 (C1), 104 (C2) and 108 (C3) in parallel connection are charged by an input voltage Vin so as to make them store Vin. During the output-phase, Vin is connected to the negative voltage terminal where the capacitors 102 (C1), 104 (C2) and 108 (C3) are connected in series to and another terminal thereof is connected to a voltage output terminal, so that Vo is boosted to a voltage of 4 Vin. In FIG. 5A(*b*), the capacitor 106 (C4) still serves as the voltage-regulating capacitor of Vo. During the charging-phase, the capacitors 102 (C1), 104 (C2) and 108 (C3) are charged by Vin to store the voltage Vin. During the output-phase, the capacitors 102 (C1) and 104 (C2) are connected in parallel to each other, followed by connecting in series them to the capacitor 108 (C3). Vin is connected to the negative voltage terminal of the capacitors 102 (C1) and capacitor 104 (C2) in parallel connection, and another terminal thereof is connected to the output terminal so as to boost Vo to a voltage of 3 Vin. In FIG. 5A(*c*), within the charging-phase, the capacitors 102 (C1), 104 (C2) and 108 (C3) are charged by Vin so as to make the capacitor 108 (C3) store a voltage of Vin, and the 102 (C1) and 104 (C2) store a voltage of 0.5 Vin. During the output-phase, the capacitors 102 (C1) and 104 (C2) are connected in parallel to each other, followed by connecting in series them to the capacitor 108 (C3). Then, Vin is connected to the negative voltage terminal of the capacitors 102 (C1) and capacitor 104 (C2) in parallel connection, and another terminal thereof is connected to the output terminal so as to boost Vo to a voltage of 2.5 Vin. In FIG. 5A(*d*), within the charging-phase, the capacitors 102 (C1), 104 (C2) and 108 (C3) are charged by Vin to store a voltage of Vin. During the output-phase, Vin is connected to the negative voltage terminal of the capacitors 102 (C1), capacitor 104 (C2) and capacitor 108 (C3) in parallel connection, and another terminal thereof is connected to the output terminal so as to boost Vo to a voltage of 2 Vin. In FIG. 5A(e), within the charging-phase, the capacitors 102 (C1), 104 (C2) and 108 (C3) are charged by Vin to make the capacitor 108 (C3) store a voltage of Vin and the capacitors 102 (C1) and 104 (C2) store a voltage of 0.5 Vin. During the output-phase, Vin is connected to the positive voltage terminal of the capacitors 102 (C1) and capacitor 104 (C2) in parallel connection, followed by connecting in series them to the negative terminal of the capacitor 108 (C3); another terminal thereof is connected to the output terminal so as to boost Vo to a voltage of 1.5 Vin. In this way, by properly wiring the circuit of the capacitors, other pumping levels can be produced. The circuits of FIGS. 5A(f), 5B(g), 5B(h), 5B(i) and 5B(j) respectively produce 1.66 Vin, 1.33 Vin, 0.66 Vin, 0.5 Vin and 0.33 Vin, and these are well known for anyone skilled in the art and omitted to describe.

A conventional charge pump requires an unchangeable capacitor as a voltage-regulating capacitor corresponding to a load. With the conventional charge pump, several external capacitors with the same capacitance are used; therefore, the produced voltage combinations are fixed and unable to be changed to obtain an optimal factor of voltage for different applications, which may results in a poor efficiency for some application voltages.

SUMMARY OF THE INVENTION

Accordingly, the present invention is directed to a multi-step charge pump and a method for producing the multi-step charge pumping, which can produce different voltage combinations in association with different load operation voltages so as to promote the efficiency of the charge pump and make the charge pump more broadly applied.

The present invention provides a multi-step charge pump having a power input terminal and a power output terminal. The multi-step charge pump includes a plurality of capacitors and each of the capacitors respectively has a capacitance. A plurality of switching devices is connected among the capacitors, the power input terminal and the power output terminal. A switch-controlling unit controls the on/off states of the switching devices to form a charging-phase circuit corresponding to a desired pumping level for charging the capacitors and to form an output-phase circuit to output a voltage from the power output terminal. At least one of the capacitors herein is changeably selected as a voltage-regulating capacitor.

According to an embodiment of the present invention, in the above-mentioned multi-step charge pump, the capacitances of the capacitors are, for example, the same or not all the same.

According to an embodiment of the present invention, in the above-mentioned multi-step charge pump, the output-phase circuit thereof includes, for example, a first circuit and a second circuit. The first circuit is formed by at least a part of the capacitors other than the voltage-regulating capacitor, wherein the capacitors to form the first circuit are connected by the switching devices. The first circuit is between the power input terminal and a grounded terminal. The second circuit includes the voltage-regulating capacitor and is connected between the power input terminal and a grounded terminal.

According to an embodiment of the present invention, in the above-mentioned multi-step charge pump, the charging-phase circuit, for example, includes a first circuit and a second circuit. The first circuit is formed by at least a part of the capacitors other than the voltage-regulating capacitor, wherein the capacitors to form the first circuit are connected by the switching devices. The first circuit has a first connection terminal connected to the power input terminal and a second connection terminal. The second circuit includes the voltage-regulating capacitor connected between the power input terminal and a grounded terminal, wherein the power output terminal is connected to the second connection terminal of the first circuit.

The present invention provides a method for producing a multi-step charge pumping to change a first voltage into a second voltage. The method includes: providing a plurality of capacitors, wherein each of the capacitors has a capacitance; providing a plurality of switching devices; connecting the switching devices among the capacitors, the power input terminal and the power output terminal; changeably selecting at least one among the capacitors as a voltage-regulating capacitor; within a first phase, controlling the switching devices to obtain a charging-phase circuit corresponding to a desired pumping level so as to allow the capacitors charged by the first voltage; within a second phase, controlling the switching devices to obtain an output-phase circuit corresponding to the desired pumping level so as to output the second voltage, wherein the voltage-regulating capacitor is between the second voltage and a grounded voltage.

BRIEF DESCRIPTION OF THE DRAWINGS

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
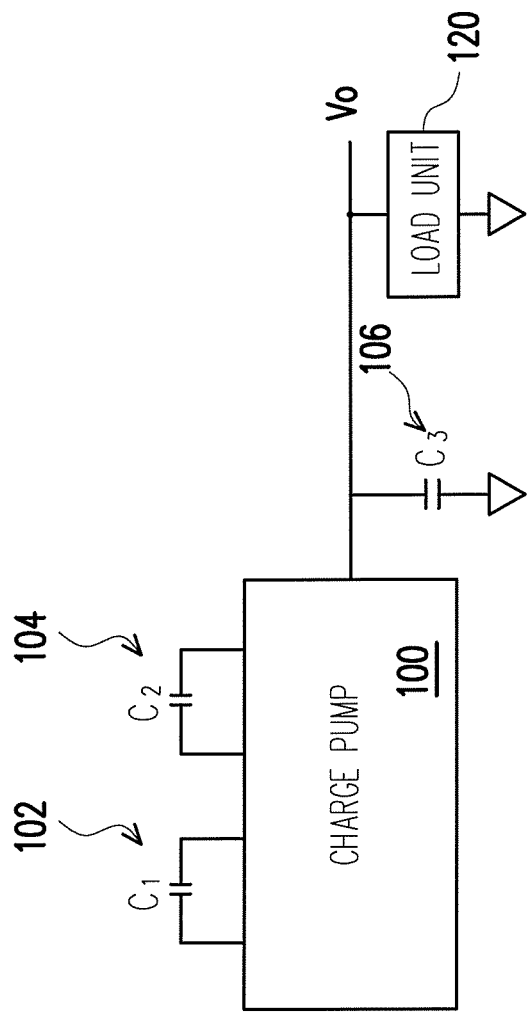
FIG. 1 is a circuit diagram of a conventional charge pump.
Figure 2:
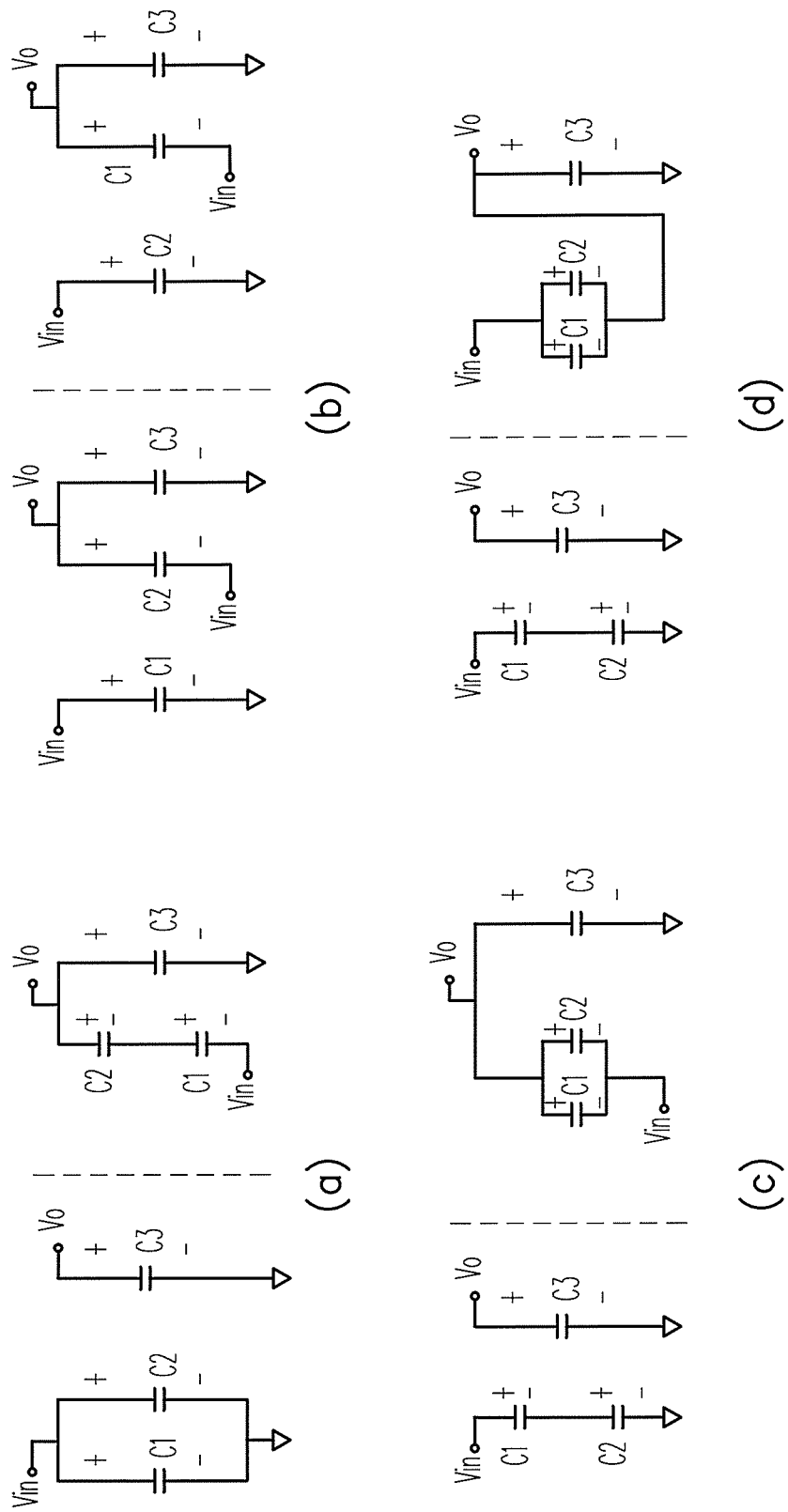
FIG. 2 is a diagram showing various wiring circuits of the capacitors in the conventional charge pump of FIG. 1, wherein the wiring circuits produce a plurality of factors of voltage and the capacitors C1, C2 and C3 are subject to C1=C2=C3.
Figure 3:
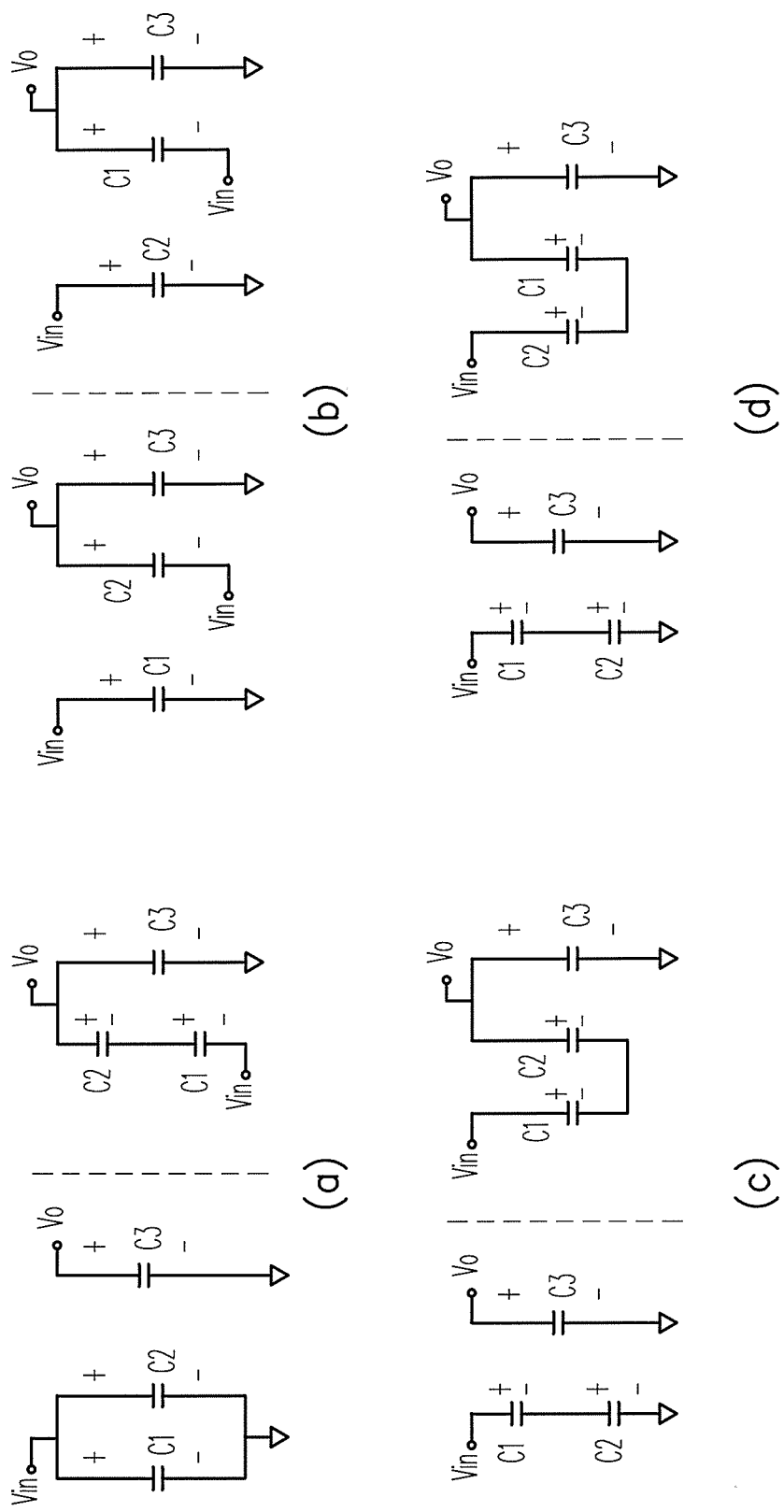
FIG. 3 is a diagram of showing various wiring circuits of the capacitors in another conventional charge pump.
Figure 4:
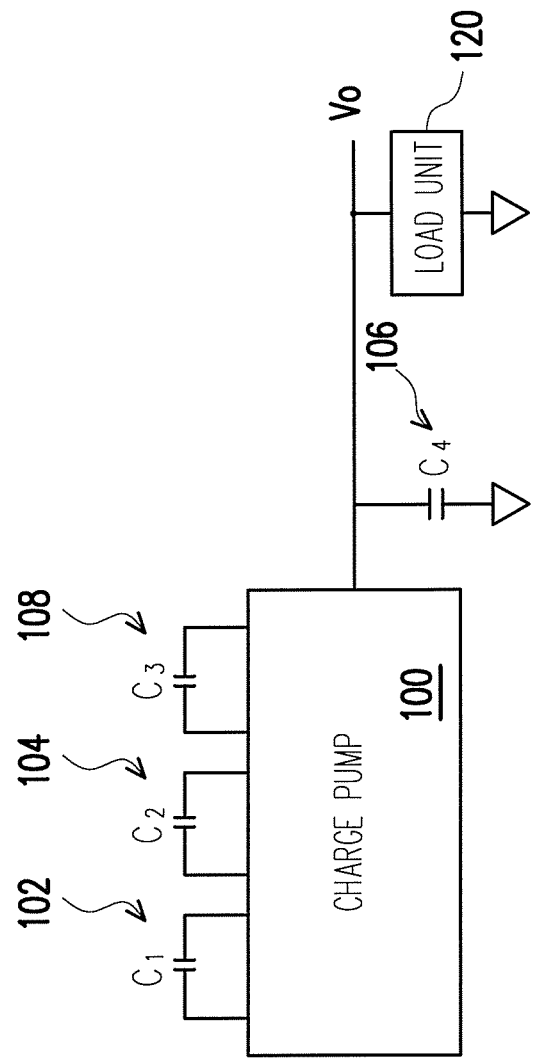
FIG. 4 is a circuit diagram of yet another conventional charge pump.
Figure 5A:
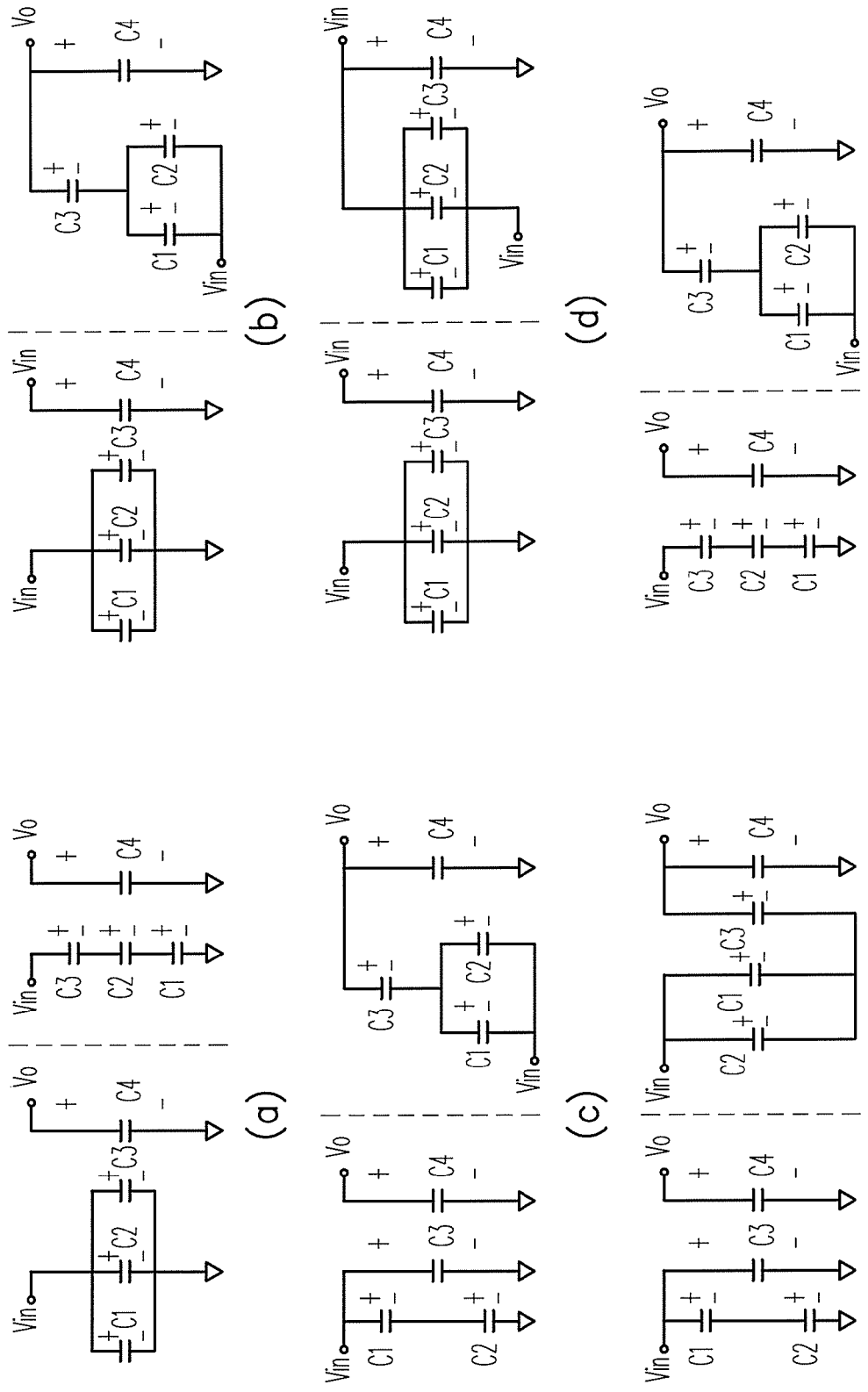
FIGS. 5A-5B are diagrams showing various switching circuits respectively for a factor in the conventional charge pump 100 of FIG. 4.
Figure 5B:
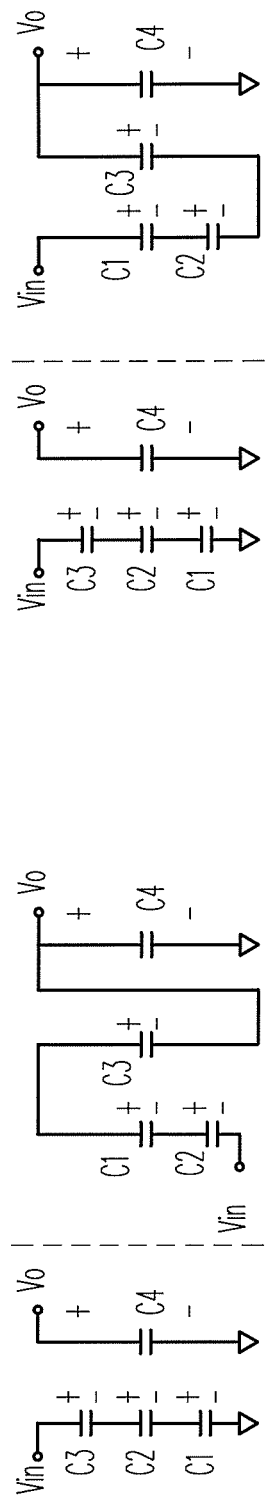
Figure 5B:
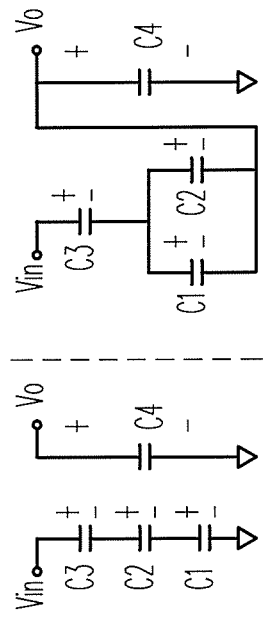
Figure 5B:
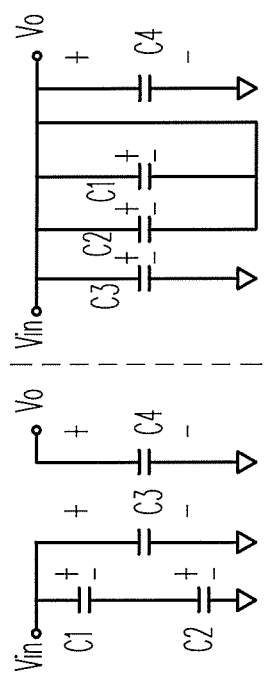

Reference will now be made in detail to the present preferred embodiments of the invention, examples of which are illustrated in the accompanying drawings. Wherever possible, the same reference numbers are used in the drawings and the description to refer to the same or like parts.

The multi-step charge pump of the present invention features that one of the capacitors thereof serving as the voltage-regulating capacitor implemented through controlling of the switch-controlling unit in the multi-step charge pump is not unchangeable one as the prior art. With the above-mentioned scheme, the multi-step charge pump of the present invention not only produces more factors of voltage, but also has an adjustable factor of voltage at any time so as to operate the multi-step charge pump without limitation to a fixed factor. In other words, a plurality of circuits is timely formed by switching the connections so as to produce different pumping levels and increase more different voltage combinations. Since there is no unchangeable voltage-regulating capacitor in the multi-step charge pump of the present invention, thus, the capacitors thereof can be more effectively used and the different factors of voltage can be selected to meet the requirement of different output voltages.

Several employments are depicted as follows, but the present invention does not limit the following embodiments.

Figure 6:
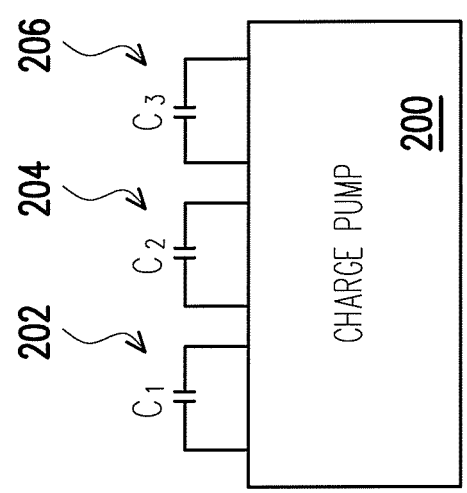
FIG. 6 is a circuit diagram of a multi-step charge pump according to an embodiment of the present invention.
Figure 11:
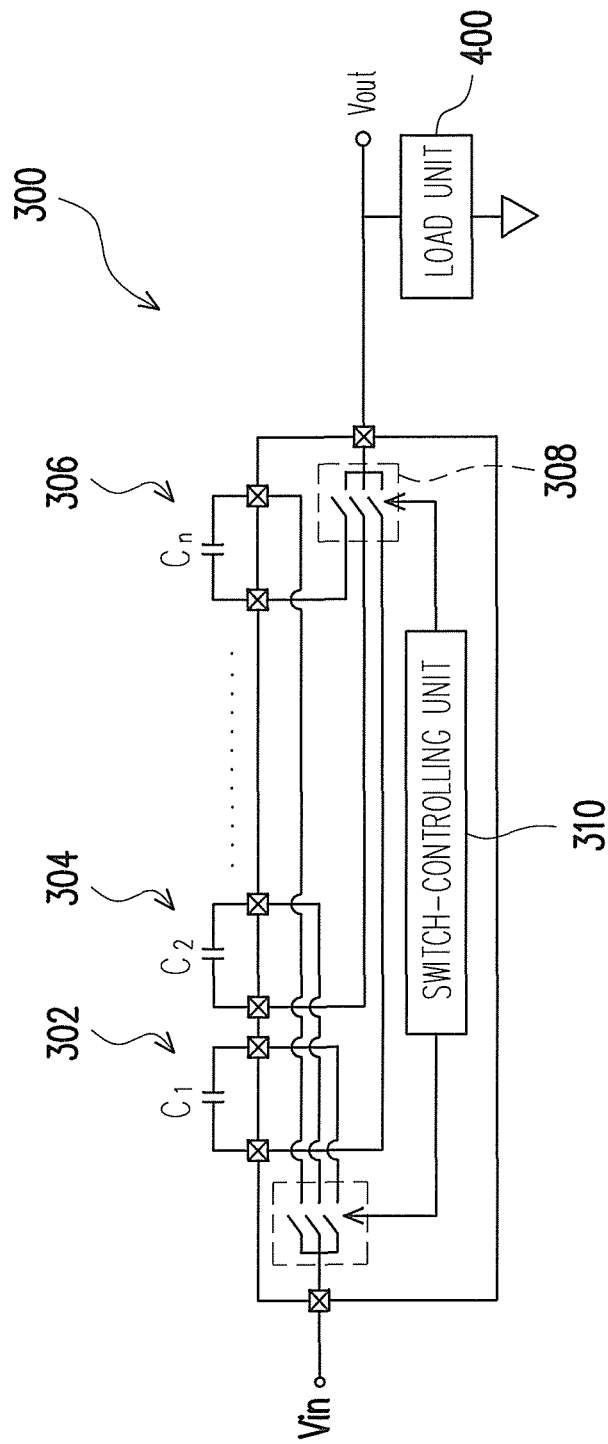
FIG. 11 is an application circuit diagram of the multi-step charge pump of FIG. 10 according to an embodiment of the present invention.

FIG. 6 is a circuit diagram of a multi-step charge pump according to an embodiment of the present invention. Referring to FIG. 6, where three capacitors are exemplarily used. A multi-step charge pump 200 includes three capacitors 202, 204 and 206 respectively having capacitances of C1, C2 and C3. The application circuit of the multi-step charge pump is illustrated in FIG. 11 in more detail. None of the capacitors in the multi-step charge pump 200 is unchangeably specified as a voltage-regulating capacitor; that is, any one of the capacitors 202, 204 and 206 can be wired to form a circuit combination for required output voltage and at least one capacitor among them is selected as the voltage-regulating capacitor to meet the need.

Figure 7A:
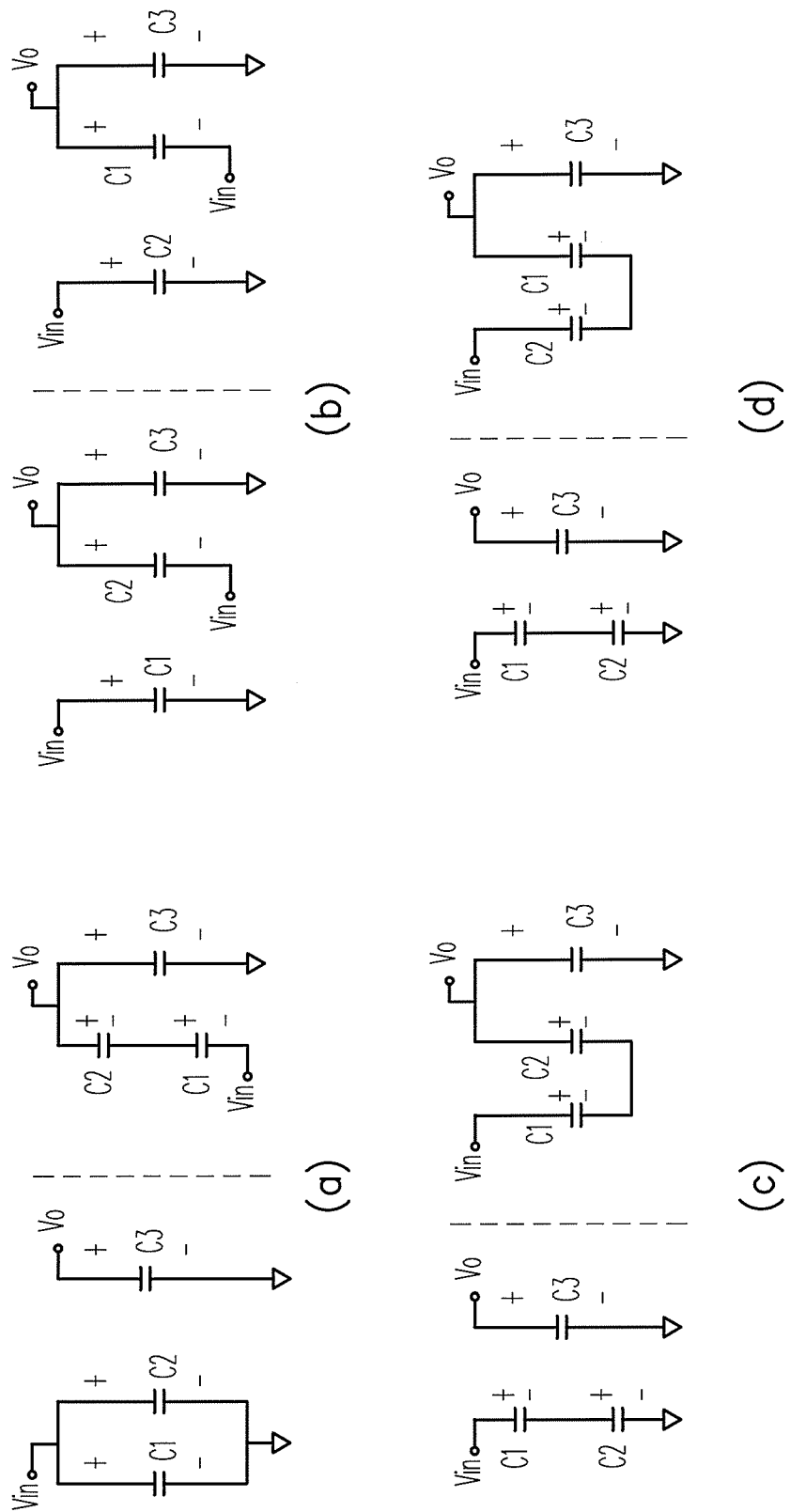
FIGS. 7A-7B are diagrams showing various combinations of the multi-step charge pumps of FIG. 6 according to an embodiment of the present invention.
Figure 7B:
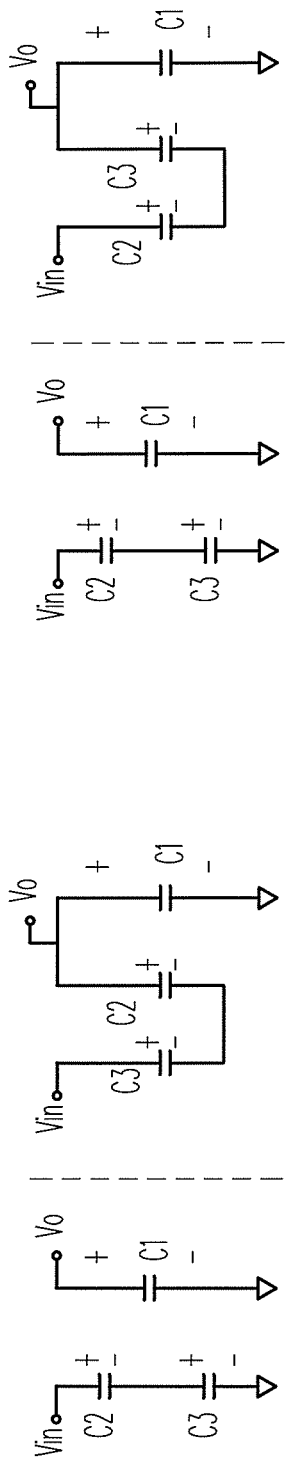
Figure 7B:
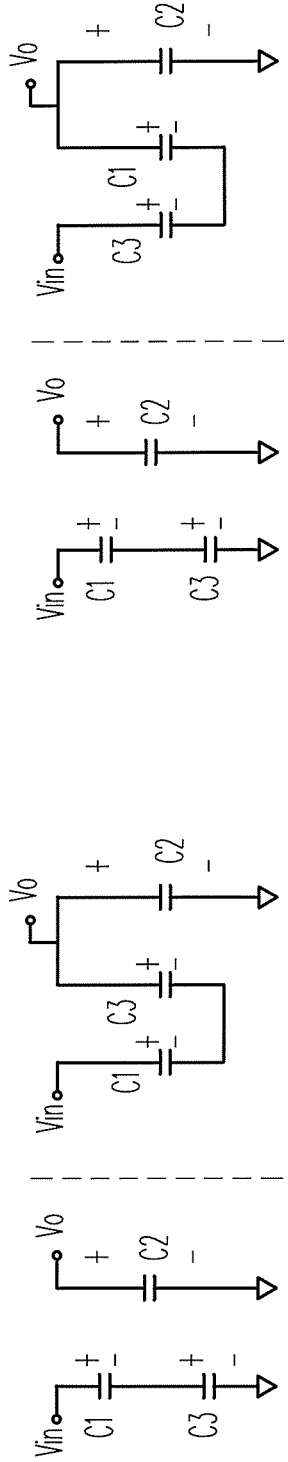

FIGS. 7A-7B are diagrams showing various combinations of the multi-step charge pumps of FIG. 6 according to an embodiment of the present invention. Referring to FIGS. 7A and 7B, since none of the three capacitors is unchangeably used as a voltage-regulating capacitor, there are more circuit combinations. The capacitors 202, 204 and 206 capacitors 202, 204 and 206 have capacitances of C1, C2 and C3, and C1:C2:C3=a:b:c, wherein a, b and c can be equal to each other or partially equal, for example, a≠b≠c. There are eight factors of voltage in total in FIGS. 7A and 7B corresponding to circuits of (a)-(h), which are respectively triple, double, [2a/(a+b)] times, [2b/(a+b)] times, [2c/(b+c)] times, [2b/(b+c)] times, [2a/(c+a)] times and [2c/(c+a)] times.

In FIG. 7A(a), for example, the capacitor 206 (C3) serves as the voltage-regulating capacitor of an output voltage Vo. During the charging-phase, the capacitors 202 (C1) and 204 (C2) are charged by an input voltage Vin so as to make them store Vin. During the output-phase, Vin is connected to the negative voltage terminal of a circuit with the capacitors 202 (C1) and 204 (C2) connected in series, and another terminal of the circuit is connected to a voltage output terminal, so that Vo is boosted to a voltage of 3 Vin. In FIG. 7A(b), for example, the capacitor 206 (C3) serves as the voltage-regulating capacitor of Vo. During the charging-phase, the capacitors 202 (C1) is charged by Vin to store the voltage Vin, and meanwhile, Vin is connected to the negative voltage terminal of the capacitor 204 (C2) and another terminal thereof is connected to the output terminal so as to boost Vo to 2 Vin. During the output-phase, the capacitor 204 (C2) is charged to store the voltage Vin, meanwhile, Vin is connected to the negative voltage terminal of the capacitor 202 (C1) and another terminal of the capacitor 202 (C1) is connected to the output terminal to boost Vo to a voltage of 2 Vin. In FIG. 7A(c), for example, the capacitor 206 (C3) still serves as the voltage-regulating capacitor of Vo. During the charging-phase, the capacitors 202 (C1) and 204 (C2) in series connection are charged by Vin so as to make the capacitor 202 (C1) store a voltage of [b/(a+b)]×Vin, and the capacitor 204 (C2) store a voltage of [a/(a+b)]×Vin. During the output-phase, Vo is equal to [2a/(a+b)]×Vin. In FIG. 7A(d), the output terminal can obtain the voltage of [2a/(a+b)]×Vin as well. Similarly to the described above, by selecting different capacitor as the voltage-regulating capacitor, a plurality of factors of voltage, such as [2c/(b+c)] times, [2b/(b+c)] times, [2a/(c+a)] times and [2c/(c+a)] times can be obtained as shown by FIGS. 7B(e)-7B(h). Since the voltage-regulating capacitor is not unchangeably assigned to the capacitor 206, thus, more factors of voltage can be produced. In addition, if the capacitances of the three capacitors are unequal to each other, far more factors of voltage than the described above can be produced.

Figure 8:
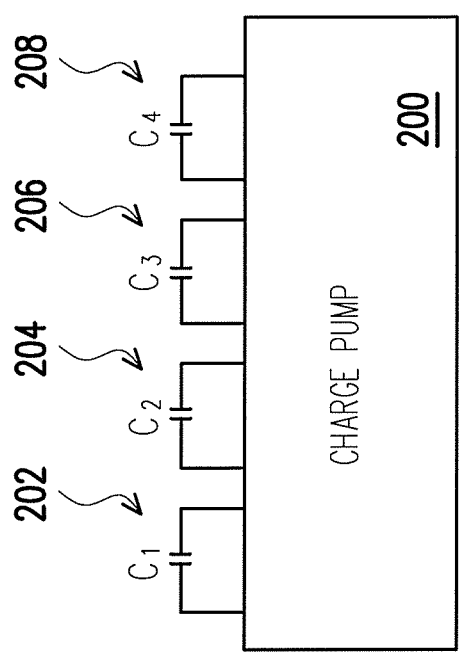
FIG. 8 is a circuit diagram of a multi-step charge pump according to another embodiment of the present invention.

FIG. 8 is a circuit diagram of a multi-step charge pump according to another embodiment of the present invention. Referring to FIG. 8, the embodiment, for example, takes four capacitors to form a multi-step charge pump. The four capacitors 202 (C1), 204 (C2), 206 (C3) and 208 (C4) in series connection herein have capacitances of C1, C2, C3 and C4, and C1:C2:C3:C4=a:b:c:d, wherein a, b, c and d can be equal to each other or partially equal, for example, a≠b≠c≠d. The multi-step charge pump of the embodiment produces a plurality of factors of voltage, for example, quadruple, triple, double, [2+2a/(a+b)] times, [2ab/(ac+bc+ab)] times, [(2ab+2ac)/(ac+bc+ab)] times . . . and so on.

Figure 9:
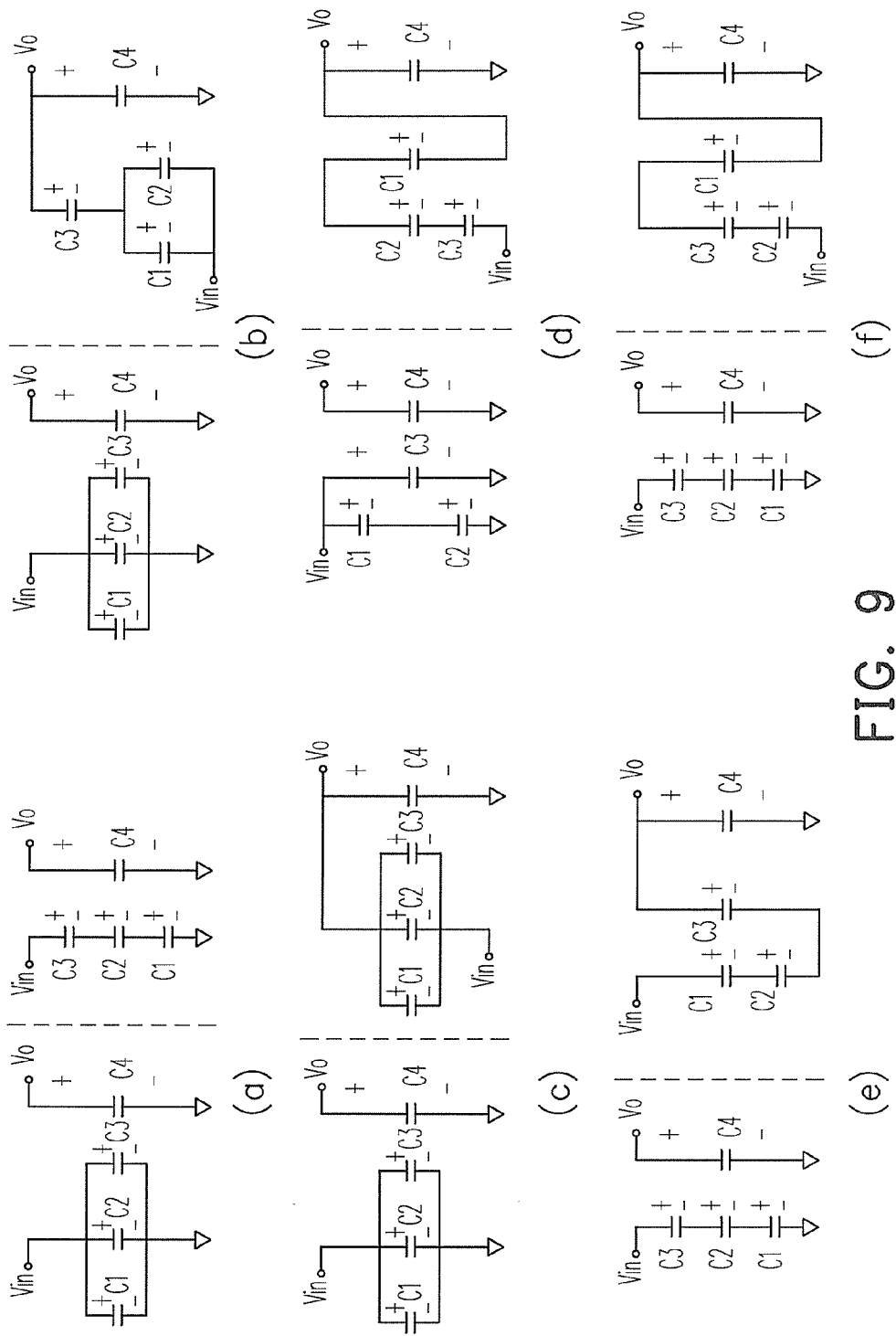
FIG. 9 is a diagram showing various combinations of the multi-step charge pumps of FIG. 8 according to the embodiment of the present invention.

FIG. 9 is a diagram showing various combinations of the multi-step charge pumps of FIG. 8 according to the embodiment of the present invention. Note that if at least one capacitor in series connection, for example two capacitors in series connection in FIG. 9, is selected as a voltage-regulating capacitor; then, the embodiment of FIG. 9 has the similar mechanism as that of FIG. 6 where three capacitors are used. In the following embodiment however, for example, one of the capacitors is changeably selected as the voltage-regulating capacitor. Referring to FIGS. 9(a), 9(b) and 9(c), the corresponding circuits respectively produce factors of voltage of four times, three times and two times. In addition, the multi-step charge pump herein has more circuit combinations, so that the circuits of FIGS. 9(d), 9(e) and 9(f) can respectively produce factors of voltage, for example, [2+2a/(a+b)] times, [2ab/(ac+bc+ab)] times and [(2ab+2ac)/(ac+bc+ab)] times . . . and so on.

For example in FIG. 9(d), the capacitor 208 (C4) is selected as the voltage-regulating capacitor. Continuing to FIG. 9(d), within the charging-phase, the capacitors 202 (C1) and capacitor 206 (C3) are charged by an input voltage Vin so as to make the capacitor 202 (C1) store a voltage of [b/(a+b)]×Vin, the capacitor 204 (C2) store a voltage of [a/(a+b)]×Vin and the capacitor 206 (C3) store a voltage of Vin. During the output-phase, Vin is connected to the negative voltage terminal of a series-connection circuit with the capacitors 204 (C2) and 206 (C3) connected in series and further connecting to the positive terminal of the capacitor 202 (C1) in series. Another terminal of the series-connection circuit is connected to the output terminal, so that Vo is boosted to a voltage of [2+2a/(a+b)]×Vin. In this way, by selecting different capacitors as a voltage-regulating capacitor, more factors of voltage can be produced.

In FIG. 9(e), Vo is boosted to a voltage of [2ab/(ac+bc+ab)]×Vin according to the configuration of the circuit. In FIG. 9(f), Vo is boosted to a voltage of [(2ab+2ac)/(ac+bc+ab)]×Vin according to another configuration of the circuit. It can be seen that more produced factors of voltage can be obtained by changing the sequence of the employed capacitors.

Figure 10:
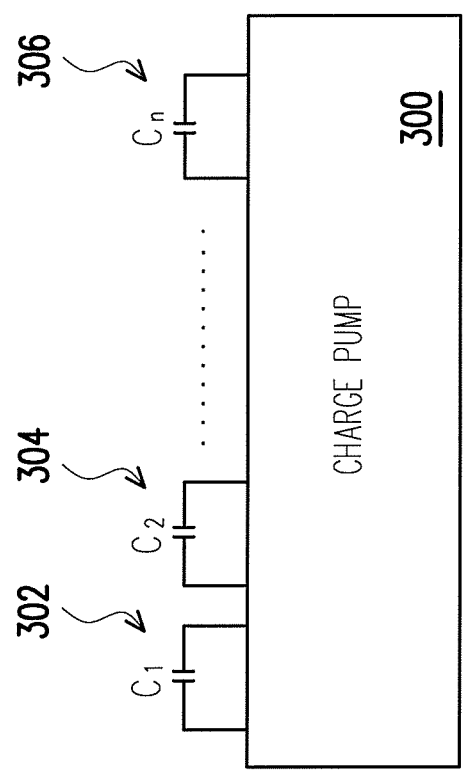
FIG. 10 is a circuit diagram of a multi-step charge pump according to another embodiment of the present invention.

FIG. 10 is a circuit diagram of a multi-step charge pump according to another embodiment of the present invention. Referring to FIG. 10, a multi-step charge pump 300 includes a plurality of capacitors 302, 304, . . . , 306 respectively having capacitances of C1, C2, . . . , Cn. By changeably selecting at least one of the capacitors 302, 304, . . . , 306 as a voltage-regulating capacitor, the desired factors of voltage of the pump can be produced.

FIG. 11 is an application circuit diagram of the multi-step charge pump of FIG. 10 according to an embodiment of the present invention. Referring to FIG. 11, a multi-step charge pump 300 includes a plurality of capacitors 302, 304, . . . , 306 respectively having capacitances of C1, C2, . . . , Cn. The power input terminal and the power output terminal are selected according to the configurations of the circuit, wherein the power output terminal has a voltage, such as Vout, and is connected to a load 400. The power input terminal can be, for example, a terminal of the selected capacitor and connected to an input voltage Vin. A plurality of switching devices 308 is electrically connected the capacitors between the power input terminal and the power output terminal. A switch-controlling unit 310 controls the on/off states of the switching devices 308. A charging-phase circuit is formed according to a desired pumping level to charge the capacitors and an output-phase circuit is also formed to output a voltage with an altered factor from the power output terminal Vout. At least one of the capacitors 302, 304, . . . , 306 is changeably selected as a voltage-regulating capacitor.

By using the switch-controlling unit 310 to control the switching devices 308 to select at least one capacitor as a voltage-regulating capacitor of the multi-step charge pump, the present invention is able to form a charging-phase circuit and an output-phase circuit corresponding to a desired factor of voltage. As a result, the multi-step charge pump of the present invention has more factors of voltage to provide a desired voltage to drive a load 400.

According to the present invention, the method for producing a multi-step charge pumping is used to change a first voltage into a second voltage. The method includes: providing a plurality of capacitors, wherein each of the capacitors has a capacitance; providing a plurality of switching devices; connecting the switching devices to the capacitors between the power input terminal and the power output terminal; changeably selecting at least one among the capacitors as a voltage-regulating capacitor; during a first phase, controlling the switching devices to obtain a charging-phase circuit corresponding to a desired pumping level so as to allow the capacitors charged by the first voltage; during a second phase, controlling the switching devices to obtain an output-phase circuit corresponding to the desired pumping level so as to output the second voltage, wherein the voltage-regulating capacitor is between the second voltage and a grounded voltage.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A multi-step charge pump, having a power input terminal and a power output terminal, the charge pump comprising:
   a plurality of capacitors, wherein each of the capacitors respectively has a capacitance, and one of the capacitors is changeably selected as a voltage-regulating capacitor;
   a plurality of switching devices, connected among the capacitors, the power input terminal and the power output terminal; and
   a switch-controlling unit for controlling on/off states of the switching devices, wherein
   a charging-phase circuit corresponding to a desired pumping level is formed for charging the capacitors, and the charging-phase circuit comprises:
      a first circuit, formed by all of the capacitors other than the voltage-regulating capacitor, wherein the capacitors to form the first circuit are connected by the switching devices, and the first circuit is between the power input terminal and a grounded terminal; and
      a second circuit, comprising the voltage-regulating capacitor and connected between the power output terminal and the grounded terminal; and
   an output-phase circuit is formed to output a voltage to the power output terminal, and the output-phase circuit comprises:
      a third circuit, formed by all of the capacitors other than the voltage-regulating capacitor, wherein the capacitors to form the third circuit are connected by the switching devices and the third circuit has a first connection terminal connected to the power input terminal and a second connection terminal connected to the power output terminal; and
      a fourth circuit, comprising the voltage-regulating capacitor and connected between the power output terminal and the grounded terminal.

2. The multi-step charge pump according to claim 1, wherein the capacitances of all the capacitors are the same.

3. The multi-step charge pump according to claim 1, wherein the capacitances of the capacitors are not all the same.

4. The multi-step charge pump according to claim 1, wherein the number of the capacitors is at least three.

5. The multi-step charge pump according to claim 1, wherein the power output terminal is connected to the voltage-regulating capacitor through the switching devices.

6. A method for producing a multi-step charge pumping, used to change a first voltage into a second voltage; the method comprising:
   providing a plurality of capacitors, wherein each of the capacitors has a capacitance;
   providing a plurality of switching devices;
   connecting the switching devices among the capacitors, the power input terminal and the power output terminal;
   changeably selecting at least one among the capacitors as a voltage-regulating capacitor;
   during a first phase, controlling the switching devices to obtain a charging-phase circuit corresponding to a desired pumping level so as to allow the capacitors charged by the first voltage; and
   during a second phase, controlling the switching devices to obtain an output-phase circuit corresponding to the desired pumping level so as to output the second voltage, wherein the voltage-regulating capacitor is between the second voltage and a grounded voltage;
   wherein the step to obtain the charging-phase circuit comprises:
      wiring all of the capacitors other than the voltage-regulating capacitor by the switch devices to form a first circuit connected between the power input terminal and a grounded terminal; and
      connecting the voltage-regulating capacitor between the power output terminal and the grounded terminal to form a second circuit; and
   wherein the step to obtain the output-phase circuit comprises:
      wiring all of the capacitors other than the voltage-regulating capacitor by the switching devices to form a third circuit having a first connection terminal connected to the power input terminal and a second connection terminal connected to the power output terminal; and
      connecting the voltage-regulating capacitor between the power output terminal and the grounded terminal to form a fourth circuit.

7. The method for producing a multi-step charge pumping according to claim 6, wherein in the step of providing the capacitors, the capacitances of all the capacitors are the same.

8. The method for producing a multi-step charge pumping according to claim 6, wherein in the step of providing the capacitors, the capacitances of the capacitors are not all the same.

9. The method for producing a multi-step charge pumping according to claim 6, wherein in the step of providing the capacitors, the number of the capacitors is at least three.

10. The method for producing a multi-step charge pumping according to claim 6, further comprising connecting the power output terminal to the voltage-regulating capacitor through the switching devices and connecting the power output terminal to an external load circuit.

* * * * *